United States Patent [19]
Thom et al.

[11] 3,793,587
[45] Feb. 19, 1974

[54] PARTICLE VOLUME AND CROSS-SECTION MEASUREMENT
[75] Inventors: Reinhard Thom, Berlin; Jurgen Schulz, Ulm, Danube, both of Germany
[73] Assignee: Licentia Patent-Verwaltungs-GmbH, Frankfurt am Main, Germany
[22] Filed: Mar. 8, 1972
[21] Appl. No.: 232,741

[30] Foreign Application Priority Data
Mar. 10, 1971  Germany................... P 21 11 356.4
Sept. 11, 1971  Germany................... P 21 45 531.2
Jan. 15, 1972  Germany................... P 22 01 894.6
Mar. 10, 1971  Germany................... P 71 08 937.7

[52] U.S. Cl. ........................................... 324/71 CP
[51] Int. Cl. ........................................... G01n 27/00
[58] Field of Search............. 324/71 CP; 235/92 PC

[56] References Cited
UNITED STATES PATENTS
3,487,697  1/1970  Epstein ...................... 324/71 CP X
3,529,239  9/1970  Valley et al.................. 324/71 CP
3,299,354  1/1967  Hogg............................. 324/71 CP
3,441,848  4/1969  Valley et al.................. 324/71 CP
3,473,010  10/1969  Bloomfield et al. ........ 324/71 CP X
3,502,973  3/1970  Coulter et al.................. 324/71 CP Primary Examiner—Stanley T. Krawczewicz
Attorney, Agent, or Firm—George Spencer et al.

[57] ABSTRACT

An apparatus for counting and classifying particles suspended in a test liquid, wherein two measuring openings are aligned, are spaced from one another, and dimensioned differently, such that a particle volume measurement may be obtained at one of the measuring openings and a particle cross section measurement may be obtained at the other of the measuring openings; a tube outlet section aligned with the measuring openings and situated spaced from a first of the measuring openings on the side of the first measuring opening opposite to the side facing the second of the measuring openings, for conducting test liquid toward said first measuring opening; the diameters of the measuring openings, the spacing between the two measuring openings, and the spacing between the first measuring opening and the outlet of the tube outlet section being of the same order of magnitude; and a vessel surrounding the tube outlet section and the measuring openings for enabling the tube outlet section and the measuring openings to be immersed in an electrolyte.

31 Claims, 5 Drawing Figures

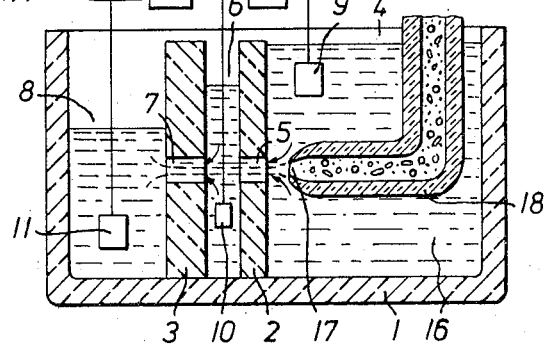
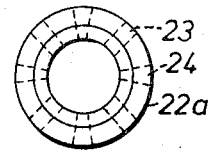
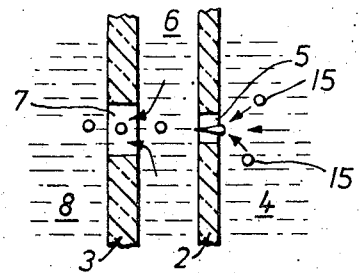
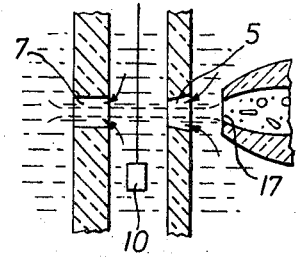
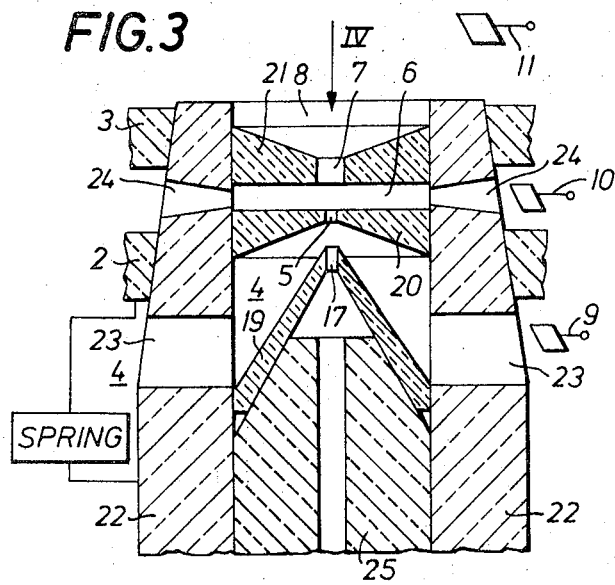

PARTICLE VOLUME AND CROSS-SECTION MEASUREMENT

BACKGROUND OF THE INVENTION

The present invention relates to an apparatus and method for counting and classifying particles suspended in a test liquid.

United States Pat. No. 2,656,508 discloses an apparatus for counting and classifying particles suspended in a liquid. The apparatus of that patent is made of two vessels which are in communication with one another through a small measuring opening. The first vessel contains the test liquid, in which are suspended particles to be counted and classified. The liquid flows through the small opening into the second vessel. Electrodes are immersed in the liquid on both sides of the opening between the vessels. These electrodes are connected to an electrical measuring circuit and have different potentials. The electrical current flowing through the liquid, which has electrolyte properties, is changed in strength when a particle moves through the measuring opening. The size of this change is a measure for the size of the particle moving through the measuring opening. The method of measuring described in that patent has become commonly known under the name "Coulter Counting."

It has become evident, however, that data obtained with an apparatus of the type described in U.S. Pat. No. 2,656,508 exhibit some errors when auxiliary means are not used to improve that basic apparatus. These errors occur most commonly due to the fact that the amplitude of the current change caused by the moving of a particle through the measuring opening is a function of whether the particle moves through the measuring opening in the proximity of the wall of the measuring opening or through the center of the measuring opening. On the basis of this knowledge, it has already been proposed to keep the electrolyte liquid in the first vessel particle-free and to lead the particles through a special conduit to the measuring opening in such a way that the electrolyte liquid flowing by the outlet of the conduit into the measuring opening focuses the particles leaving the outlet in suspension hydrodynamically in the center of the measuring opening. To do this, it has been specially proposed to make the distance between the outlet and the measuring opening so small that the electrolyte flowing by the outlet sucks the test suspension out of the outlet; thus, the feeding of the test suspension is not done under pressure. Especially good results are obtained when this sucking is used.

In all known apparatuses, essentially only particles of different volumes can be distinguished from one another. However, it is often desired to distinguish particles from one another according to their diameters. The above-described apparatus, even that with particle feeding through a special conduit, is not able to do this.

A principal area of application of the above-described apparatus is in the measuring of blood cells. There is a special problem here which needs solving, namely the distinguishing of leukocytes from agglomerated erythrocytes. If one wants to distinguish erythrocytes and leukocytes by the Coulter method, this is only possible when, after leukocyte enrichment, the concentration difference - in whole blood there are about 700 erythrocytes for every leukocyte - is considerably lessened. In unfractionated blood, those erythrocytes which do not pass through the Coulter measuring opening singly are recorded in the volume range of the leukocytes, since the volume of one leukocyte is about equal to the combined volume of from two to four erythrocytes. The coincidence probability of a simultaneous passing of two or more erythrocytes through a measuring opening cannot be arbitrarily decreased by dilution, because the distances between the erythrocytes are not determined just by statistical factors. Rather, about one to 10 percent of the erythrocytes remain agglomerated even at high degrees of dilution. The amount of erythrocytes which are agglomerated depends on the particular suspension medium being used. The erythrocytes agglomerate such that the individual erythrocytes are like the coins in a roll of coins. The counting or measuring of leukocytes in whole blood or in thinned whole blood is thus not possible without there first being carried out preparative steps for reducing the erythrocyte fraction by at least a factor of 100. In preparative methods based on a selective hemolysis of the erythrocytes, the electrically insulating property of the leukocyte membranes required for altering the electrical current in the Coulter method is reduced or removed. On the other hand, sedimentation methods preclude quantitative determinations, because the extent of the leukocyte enrichment is not determinable to sufficient exactness.

SUMMARY OF THE INVENTION

An object of the present invention, therefore, is to provide apparatus and method for distinguishing particles both by their volumes and by their diameters or cross sections.

Another object of the present invention is to provide method and apparatus for distinguishing leukocytes from erythrocyte agglomerates.

These as well as other objects which will become apparent in the discussion that follows are achieved, according to the present invention, by an apparatus for counting and classifying particles suspended in a test liquid, including, in combination, means forming two measuring openings coaxially aligned, spaced from one another, and dimensioned differently, whereby a particle volume measurement may be obtained at one of the measuring openings and a particle cross section measurement may be obtained at the other of the measuring openings; tube means having an outlet section coaxial with said measuring openings and situated spaced from a first of said measuring openings on the side of said first measuring opening opposite to the side facing the second of the measuring openings, for conducting test liquid toward said first mesauring opening; the diameters of said measuring openings, the spacing between said two measuring openings, and the spacing between said first measuring opening and the outlet of said tube means being of the same order of magnitude; and vessel means surrounding said outlet section and said measuring openings for enabling said outlet section and said measuring openings to be immersed in an electrolyte.

GENERAL ASPECTS OF THE INVENTION

The solution according to the present invention of the above object of being able to distinguish leukocytes from erythrocyte agglomerates brings with it the solution of the other object of being able to distinguish between particles of equal volume but different shape. The apparatus and structure of the present invention start from the above-described Coulter apparatus and method and the described later developments of Coulter's apparatus and method. There is in the present invention a first vessel containing particle-free electrolyte. The test suspension is fed by means of a feed conduit to a measuring opening. The outlet of the feed conduit is coaxially upstream from the measuring opening and is spaced from the measuring opening such a small distance that electrolyte liquid flowing into the measuring opening sucks test suspension out of the outlet of the feed conduit and injects it into the center of the measuring opening.

The apparatus of the present invention is distinguished in that two measuring openings, with corresponding vessels, electrodes, and electrical measuring circuits, are provided. These two measuring openings are arranged in the liquid flow stream one after the other and their opening diameters and/or lengths are differently coordinated with one another in such a manner that essentially the volumes of particles are sensed with one measuring opening and essentially the cross sections of the particles are measured with the other measuring opening.

Instead of referring to the determining of cross sections, it is also proper to refer to determining of lengths of particles, because equal-volumed particles of different cross section have, of course, different lengths.

It is critical in the present invention that the technique of hydrodynamically sucking test suspension out of a feed tube and injecting it through the center of a measuring opening be used. Thus, the electrical current differences to be detected in differentiating particles lie in the order of magnitude of the current differences caused by a particle going through a measuring opening in the proximity of its wall as opposed to going through the center of the opening. Hydrodynamic sucking and injecting through the action of electrolyte flow is achieved in the apparatus of the present invention when the spacing between the outlet of the suspension feed tube and the first of the measuring openings, the spacing between the two measuring openings, and the minimum inner diameters of the measuring openings are of the same order of magnitude. In the method of the present invention, the step of sucking is effected by choosing parameters such as fluid pressures and viscosities for achieving a hydrodynamic sucking by electrolyte flow around the feed tube and into the first measuring opening.

The different measuring of the particles in the two measuring openings of the present invention can be done by different measuring methods. For example, an effect referred to under the term "form factor" can be utilized. The form factor makes itself felt in particle volume analysis according to the Coulter method. If a very long and streamlined particle having, for instance, the shape of a torpedo, moves through a measuring opening, the change in resistance obeys to a first approximation the following relationship: the resistance change $\Delta R$ is to the resistance R of the measuring opening as the particle volume is to the measuring opening volume. This relationship holds because the ions carrying the electrical current are only crowded toward the walls of the measuring opening; they are not caused to change their direction of movement.

For local uniformity of the electric field, if one assigns such a streamlined particle with a form factor of 1.0, then a spherical particle of the same volume has a form factor of 1.5. Thus, for spherical particles, the above relationship must be adjusted by dividing the resistance change $\Delta R$ by 1.5. The form factor may be calculated, but is more often determined experimentally in the electrolytic tank.

At the outlet and inlet of a measuring opening, and especially in the case of short measuring openings, the fluid flow and electric fields become strongly nonuniform, so that other correcting factors, besides the form factor, can be determined. These other correcting factors depend on the geometry of the measuring opening and, in the case of deformable suspended particles, on the viscosity of the suspension medium.

If the measuring opening is so small that the region of approximately uniformly high field strength in the measuring opening is smaller than the length of a particular particle moving through the measuring opening, then there is an underevaluation of particle volume. This is because the ends of the particle extend out of the region of concentrated electric field during the instant when a measurement is made. The ends thus do not contribute to causing a resistance change as much as does the central portion of the particle. So, in relatively short measuring openings, the different sensing of long versus round particles does not proceed according to the form factors. The long particles appear to have a smaller volume than they really do. Evaluation is now proceeding as a function essentially of particle cross sections.

Thus, according to the present invention, two measuring openings of different geometry are provided. One of the openings must be long enough to contain in the region of uniform field strength the entire volumes of the particles moving through it. The other of the openings has a short length to evaluate essentially particle cross sections. Thus a differentiating of particles according to their forms is possible. The evaluation here proceeds completely by measuring current change amplitudes during passage of the particles through the measuring openings.

In another method of measuring, one evaluates in the measuring opening serving for the differentiating of equal-volumed particles of different form or deformability the durations of the current changes during the moving of particles through the measuring opening. If the length of the measuring opening has the same order of magnitude of the particle lengths or is smaller than the particle lengths, then an elongated particle causes a pulse, which after rising remains at a maximum for a certain length of time and then falls. A spherical particle produces, in contrast, a pulse that falls immediately after reaching a maximum. If the spherical particle has the same volume as an elongated particle, then the pulse for the spherical particle is higher than the pulse for the elongated particle, but the pulse of the spherical particle is shorter.

In the method of evaluating by measuring pulse durations, it is necessary to undertake amplitude determination also, should it be desired to differentiate particles differing in volume, particles of different form, or deformable particles. Here, it must be realized that a large spherical particle can give a pulse having the same duration as a pulse for a smaller elongated particle. These particles do differ, however, in the amplitudes of the pulses that they produce. Consequently, one can advantageously form the ratio of the duration of a pulse to its amplitude and then evaluate this ratio. This provides a differentiation of particles that have pulses of equal length.

It is preferred to determine the duration of a pulse by sensing the exceeding of a predetermined amplitude level as the beginning time point, with the end of the pulse being at that point in time when the amplitude finally falls below this level. Thus, pulses not exceeding the predetermined amplitude level are not measured. It is also possible, to measure the time span extending between the time that a pulse reaches its maximum and the time when it has fallen back to a predetermined percent of the maximum; thus, for instance, when it has fallen back to half of the maximum amplitude.

The evaluating of both pulse durations and amplitudes yields very significant results.

To differentiate agglomerated erythrocytes from leukocytes, one uses a phenomenon based on the nature of the cells to be investigated. Erythrocytes and leukocytes differ not only in volume. They differ also in deformability. Mammalian erythrocytes have no nucleus. In contrast to the leukocytes, the erythrocytes are extremely easily deformable, due to their small inner viscosity. When flowing through a measuring opening, erythrocytes lose their well known generally lenticular form and are elongated up to 20 microns because of the hydrodynamic pressure conditions present in the measuring opening. This is about three times the diameter of an erythrocyte at rest. The apparatus of the present invention, which provides one relatively long measuring opening and one relatively short measuring opening, evaluates the particles differently in the long measuring opening and in the short small measuring opening. The leukocytes retain, because of their stiffness, their spherical form of 6 to 8.5 microns diameter in both measuring openings. The leukocytes are still evaluated proportionally to volume in measuring openings of about 40 microns length, where erythrocytes are under-evaluated with respect to volume by at least 10 percent. The deformation of a particle is also dependent on the diameter of an opening. If one reduces the dimensions of a measuring opening, i.e., the length or the cross section, or both, the differences in the evaluations become even greater.

In the case of measuring particles at least including deformable particles, for instance erythrocytes, it is possible to make the lengths of the two measuring openings the same. The diameters of the measuring openings must then be different. The smaller diameter is chosen to cause the deformable particles to elongate. The ends of the deformable particles protrude from the front and back of the measuring opening of smaller diameter, so that a distinguishing on the basis of form is achieved in the measuring opening of smaller diameter. The common length of the two measuring openings, while being sufficiently small to allow the protruding of the elongated deformable particles, must still be chosen sufficiently large to allow for complete containment of the particles in the measuring opening of larger diameter so that volume analysis may be carried out. The diameter of the measuring opening of larger diameter is chosen sufficiently large so that no appreciable deforming takes place. On the other hand, the diameter must not be chosen so large that the fields become nonuniform even at the center of the axis of the opening.

From the above, it will be apparent that the core of the present invention lies in the situating of two Coulter-type measuring openings of different dimensions, i.e., non-identical openings, one after the other in a particle evaluating device utilizing the principle of sensing resistance changes in a measuring opening containing electrolyte.

Using known analog or digital, electronic methods, the above-described method that uses the sensing of amplitudes only, can be carried out by determining the ratio of the pulse amplitudes derived during the moving of a particle through the measuring openings from the current change in the electrical measuring circuit. In the case of analog ratio forming, one can amplify the pulses for the two measuring openings in separate branches and delay one pulse relative to the other such that the signals from the two branches become congruent in the case of spherical cells. By a subsequent analog subtraction of the two pulses, a final output that is practically zero is obtained for spherical cells. The same is valid for non-deformable solid bodies. When a deformable cell, or an elongated solid body, of the same volume as in the spherical case passes through the measuring openings, the final output deviates from zero and is available for control of further evaluation. It is naturally also possible to first transform the two amplified signals from analog form to digital form, and then carry out the ratio forming purely digitally. This eliminates the need for a delaying as in the analog case.

In the case of the second above-described method of evaluating, one can again use delay devices in the electronic evaluating equipment to bring about a matching of the pulse lengths, or pulse-length/pulse-amplitude ratios sensed in the one of the measuring openings with the absolute particle volumes sensed in the other of the measuring openings.

An oscilloscope may also be used for observing the resistance changes caused by particles moving through the measuring openings.

The pressure conditions in the individual vessels used in the present invention are preferably so matched to one another that more liquid flows into the second measuring opening from the vessel downstream from first measuring opening than flows into the vessel from the first measuring opening. For a coaxial arrangement of the measuring openings, with a small spacing between them, this assures that there will be no diverging of the test suspension stream and that all particles that have passed through the first measuring opening will get into the second measuring opening so that it will be possible to evaluate any given particle in both measuring openings. To this end, it is preferred that the first measuring opening in the test suspension stream be that with the smaller dimensions, with the second measuring opening then being that with which the absolute volume determinations are carried through.

There is obtained here a further, very significant advantage. Namely, the measuring of the particle volumes in a second measuring opening is improved over that previously obtained with only one measuring opening. The test suspension beam has already been completely focused when it enters into the current loop belonging to the second measuring opening. The beam is therefore homogeneous in this current loop. The converging character of the test suspension beam between the outlet of the feed tube and the first measuring opening has been lost by the time the beam reaches the current loop belonging to the second measuring opening. This causes an improvement in the simultaneous determination of large and small particles, i.e., an improvement of the volume dynamics of the measuring arrangement.

This improvement is explained in greater detail as follows. Assuming that the outlet of the feed tube is situated just before the first measuring opening so that hydrodynamic sucking of test suspension out of the feed tube is obtained, then the converging portion of the test suspension stream lies in the electrical measuring circuit. The particles, which are coming from the outlet of the feed tube, move slowly at first and are then accelerated by the narrowing down of the test suspension stream as a result of the hydrodynamic focusing caused by the surrounding liquid stream. The pulses, which are registered in the electrical evaluating device, therefore rise slowly at first, thence to rise abruptly when the particular particle being followed enters into the measuring opening, due to the compression of the flow and electric fields in the measuring opening. As long as the particle is in the measuring opening, the pulse height remains constant. When the particle leaves the measuring opening, the pulse abruptly falls. Since the suspension stream itself has a very small diameter in comparison with the thickness of the liquid electrolyte stream surrounding and entraining the suspension stream, any diverging of the suspension stream does not occur until far behind the measuring opening. Such diverging cannot influence the measurement in the measuring opening. This lack of divergence when leaving the measuring opening is responsible for the abrupt falling of the pulse when the particle leaves the measuring opening. Now, suppose that a very small particle is right in the measuring opening when a large particle comes out of the outlet of the feed tube. The pulse height caused by the large particle even during the rise of its pulse is much larger than the pulse height of the very small particle. This will cause a falsification of the pulse amplitude of the small particle. Should a large particle be in the measuring opening when another particle leaves the outlet of the feed tube, the pulse read for the large particle in the measuring opening is increased by the pulse rise of the new particle, and the measuring accuracy is lessened. A particle larger than actually present is indicated. In the preferred situation in the present invention where the volume-measuring opening is the second measuring opening, the zone where the particles are accelerated after leaving the outlet of the feed tube lies outside of the electric field region belonging to the current loop of the second measuring opening. The individual particles lie at greater distances from one another in the suspension stream at the second measuring opening than they do while still in the converging portion of the stream just after the feed tube outlet. The influencing of the pulse of one particle by that of another is completely eliminated at the second measuring opening. Since the number of particles located in the second electrical measuring loop is likewise lessened, noise caused by the particles is less in the present invention than in apparatus where determination of the exact particle volumes is made with the one and only measuring opening.

Thus, better particle volume determinations can be carried out with the apparatus of the present invention, even when it is not required that there be a distinguishing of particles with regard to their form or deformability. When no form-distinguishing is needed, the first measuring opening serves only the purpose of providing an improved focusing and of providing a screening of the electrical field, which extends through and around the second measuring opening, from the portion of the suspension stream of converging character located in front of the first measuring opening. Along with the improvement in the accuracy of measurement, there is another advantage obtained here. The steepening of the rise of the pulses at the second measuring opening means that the counting pulses are considerably shorter, so that an increase in the possible counting rate is obtained. If one only wants to carry out volume measurements using the second measuring opening, it is possible to achieve under conditions where a counting rate of about 1,000 particles/second had been the maximum achievable rate an increased counting rate of about 10,000 particles/second while yet maintaining good resolution. Moreover, less coincidences, i.e., the sensing of two particles at the same time, occur in the apparatus of the present invention.

The above-mentioned influences of the converging portion of the suspension stream on the pulse form do show up in the pulses arising from the moving of particles in the current loop of the first measuring opening. Since, however, the purpose of the first measuring opening in the present invention is to distinguish between particles of equal volume but different form or deformability, great accuracy is not required in the first current loop. Thus, the above-mentioned influences on the measurements do not disturb those measurements made in the first current loop.

BRIEF DESCRIPTION OF THE DRAWING

FIG. 1 is an elevational sectional view of an apparatus according to the invention.

FIG. 2 is a detail view of a portion of an apparatus according to the invention.

FIG. 3 is a detail view of a modified apparatus according to the invention.

FIG. 4 is a view of a modified tube of FIG. 3 from the direction IV shown in FIG. 3.

FIG. 5 is a view as in FIG. 1 of a modified portion of the apparatus of FIG. 1.

DESCRIPTION OF THE PREFERRED EMBODIMENTS

Referring firstly to FIG. 1, vessel 1 is provided with two dividing walls 2 and 3, which divide the interior of the vessel into three chambers. Chamber 4 contains electrolyte liquid 16, which entrains particles to be classified and flows through opening 5 in dividing wall 2 into chamber 6, and through opening 7 in dividing wall 3 into chamber 8. Electrodes 9, 10 and 11 are immersed in the electrolyte liquid contained in chambers 4, 6 and 8. These electrodes exhibit different potentials relative to one another. Electrodes 9 and 10 are connected with measuring device 12 where current changes are registered. These current changes arise when a particle entrained in liquid 16 passes through measuring opening 5. Correspondingly, electrodes 10 and 11 are connected to measuring device 13, which registers the current changes arising when particles move through the opening 7.

Opening 5 may have a smaller diameter than opening 7, and thus, as described above, essentially the cross sections, i.e. forms, of deformable particles would be evaluated in opening 5, while opening 7 would be used for evaluating essentially volumes. As shown, openings 5 and 7 have the same diameter, while opening 5 has a small length so that long particles protrude from the front and back of the opening when going through the opening, while round particles do not. The two criteria can even be combined, i.e., the length and diameter of opening 5 are made smaller than those of opening 7 as shown in FIG. 2.

The results, which are received by measuring devices 12 and 13 of FIG. 1, are fed into an evaluating device 14, where as above-described an evaluating of equal-volumed but differently formed or deformable particles is carried out.

FIG. 2 shows how deformable particles are influenced differently by the measuring openings. Particles 15, which are erythrocytes, an example of deformable particles, are deformed into a torpedo shape in the narrow measuring opening. That is, they become elongated and no longer maintain their lenticular shape. The measuring opening 5 is thus so shaped that it is shorter than an elongated erythrocyte in order to make the ends of the erythrocytes protrude from both sides of the measuring opening. The following measuring opening 7 passes the particles 15 undeformed. The liquid flow is indicated by the arrows.

FIG. 2 additionally illustrates the preferred method of the invention where liquid additional to that coming from measuring opening 5 flows from chamber 6, together with that coming from opening 5, into chamber 8. Electrodes and measuring equipment are not shown in FIG. 2. Liquid flow through the openings may be controlled by providing different liquid levels in the chambers 4, 6, and 8, as shown in FIG. 1.

The special type of particle conducting from a feed tube is illustrated in FIG. 1. At a small distance before the measuring opening 5, an outlet 17 of a feed tube 18 for conducting test suspension toward measuring opening 5 is provided. The electrolyte liquid 16 in chamber 4 before the first measuring opening is particle-free. The particles are conducted to the measuring opening 5 in suspension through feed tube 18. The electrolyte liquid 16 flows into the measuring opening 5, due to the higher liquid level in chamber 4 than in chamber 6, and sucks test suspension out of the outlet 17 due to the small space between the outlet 17 and the measuring opening 5. The test suspension entrained by the electrolyte is hydrodynamically focused and injected into the center of the measuring opening 5. The edges of the cross section of the test suspension liquid beam are indicated by the dashed lines extending from outlet 17 to the downstream side of the second measuring opening, opening 7. Where the focusing is being effected, the beam has a converging character. Then the beam extends homogeneously through openings 5 and 7. On the downstream side of opening 7, the beam is shown to diverge. This type of test suspension feeding with hydrodynamic focusing is important for achieving the necessary accuracy of measurement.

The apparatus of the present invention makes it possible to carry out tests on thinned whole blood without it being necessary to first reduce the erythrocyte concentration relative to the leukocyte concentration in the smaples. And, the apparatus of the present invention allows the clear distinguishing of two or more erythrocytes, clinging together as a unit, from leukocytes.

The apparatus of the present invention is principally intended for investigating very small particles. Thus, discussion above has been of the application of the apparatus for blood analysis. It is, therefore, necessary to consider how to form the details of the measuring openings and the particle-feeding equipment. If blood corpuscles are to be determined, then the opening diameters of the measuring openings and the outlet of the feed tube lie in the order of magnitude of about 50 microns. Also the mutual spacing of the measuring openings and the spacing of the outlet opening of the feed tube from the first measuring opening lie in this order of magnitude.

It is, in general, very difficult to provide such small openings in vessel walls with the requisite high accuracy and to arrange them accurately relative to one another. Consequently, according to a preferred embodiment of the present invention, at least the outlet opening of the feed tube and the first measuring opening are provided in building blocks that can be manufactured separately from the remainder of the apparatus. These building blocks are held by a common support element.

Moreover, it is desired that an apparatus according to the present invention be able to measure particles of dimensions other than those of blood cells. For this reason, the support element holding the building blocks has the feature of being provided as an exchangeable component in the apparatus. The rest of the apparatus can be used for all particle diameters and only the support element carrying the building blocks dependent on particle size need be exchanged, depending on the particles to be measured.

Preferably, the support element forms a part of the dividing walls when it has been mounted in the apparatus. An especially favorable embodiment of the support element is a tube in which the mentioned building blocks are arranged and contained. Thus, in a single tube, there is arranged the feed tube outlet, the first measuring opening, and, according to the particular embodiment, the second measuring opening, one behind the other. The support element tube is then pushed into a receiving area in the vessel walls and secured in place. The chambers formed by the building blocks in the support element tube must be placed in the appropriate communicating relationships with the surrounding of the tube where the electrodes are located. This is done by holes in the wall of the support tube. The holes allow, furthermore, for the appropriate flow of electrolyte liquid. The holes into the chamber between the feed tube outlet and the first measuring opening may be offset angularly, with regard to angles around the support element tube axis, relative to the holes into the chamber between the first and second measuring openings, in order not to endanger the mechanical stability of the support element tube. Preferably, the holes taper, thus having a funnel shape.

The building blocks provided in the support element tube have, naturally, much larger outer diameters than their particular opening diameters. The volume of the test suspension contained before the feed tube outlet would be determined by these outer diameters, since they are equal to the inner diameter of the support element tube, and thus the test suspension volume would be unnecessarily large. A complete emptying would claim unnecessary time. It is, therefore, advantageous to place a capillary tube in the support element tube in such a manner that the capillary tube reaches to the building block forming the test suspension feed tube outlet. The capillary tube reduces the effective feed tube cross section down to within the order of magnitude of the feed tube outlet diameter or below.

The support element tube carrying the building blocks is preferably given a conical outer surface for mating with a funnel-shaped receiving area in the vessel walls. Glass is a suitable material for the support element tube, while the building blocks can be provided as drilled saphires which are glass-bonded to the inner wall of the glass tube.

Referring to FIG. 3, the feed tube outlet opening 17, the first measuring opening 5, and the second measuring opening 7 are provided as separately manufacturable building blocks 19, 20 and 21. These building blocks are drilled saphires mounted in a cylindrical glass tube 22 serving as supporting element. The building blocks are glass-bonded to the inner wall of the tube 22 at the desired spacings from one another. Glass tube 22 has a conical outer surface on its end and fits into mating funnel-shaped receiving areas in the first dividing wall 2 and the second dividing wall 3. Tube 22 may be spring biased, as shown, into its seat in the receiving areas and may be exchanged by release of the spring. Holes 23 serve for the flow of electrolyte liquid for hydrodynamically sucking test suspension out of outlet 17. Holes 24 in the wall of tube 22 open a path from electrode 10 into the chamber 6 before the second measuring opening and may serve additionally for the feeding of more electrolyte for the purpose of preventing turbulence and for obtaining better focusing as above-described. This additional electrolyte flows from chamber 6, through measuring opening 7. In the modified tube 22a of FIG. 4, holes 23 and 24 are angularly offset with respect to one another to increase the strength of the tube.

Since this additional electrolyte is the same electrolyte used for focusing or converging the feed suspension as it comes out of the outlet 17 in front of the first measuring opening 5, the first dividing wall 2 can be omitted if electrode 10 is placed in chamber 6 and the requisite fluid flow relationships are obtained by appropriate choice of the diameters of the holes 24. This type of construction provides a further simplification in that a fitting of the support element tube 22 is only required with the remaining dividing wall 3.

Naturally, an electrical connection through tube 22 to the electrode 10 in chamber 6 is necessary in this modification of the apparatus of the invention.

In order to reduce the effective tube cross section before the feed tube outlet 17, i.e., to reduce the volume of test suspension in the tube 22, a capillary tube 25 has been inserted into tube 22. The capillary tube 25 ends at building block 19 and reduces the cross section of tube 22 to within an order of magnitude of the diameter of outlet 17, or below. Electrode circuitry connected to electrodes 9, 10 and 11 has not been shown in FIG. 3.

For analyzing blood corpuscles, the following opening dimensions have proved suitable when using a NaCl solution as electrolyte:

1. For the measuring opening 5, a cylindrical shape with a length of about 15 microns and a diameter of about 40 microns; or, a conical shape as shown in FIG. 5 with a length of about 22 microns, an inlet diameter of about 50 microns, and an outlet diameter of about 43 microns.

2. For the second measuring opening, a cylindrical form with a diameter of about 40 microns and a length likewise of 40 microns.

3. For the outlet of the feed tube, likewise a diameter of 40 microns.

4. For the spacing between the outlet of the feed tube and the first measuring opening, a distance of 40 microns.

5. For the spacing between the two measuring openings, a distance of 40 microns.

When all openings are given the same diameter, as in the above example, it is especially easy to assembly them into the desired structure. The building blocks containing the openigns, for example, drilled saphires, can then be threaded onto a common wire and fixed, (for example, by glass-welding them in place in a glass tube) in their positions as determined by the required mutual spacings. The wire is then pulled out. The threading of the saphires onto the wire assures the requisite coaxial arrangement of all the openings. The term "order of magnitude" is used in this disclosure to mean the following: Two quantities are of the same order of magnitude if one is no larger than ten times the other. See WEBSTER'S THIRD NEW INTERNATIONAL DICTIONARY OF THE ENGLISH LANGUAGE UNABRIDGED, G. & C. Merriam Company, Springfield, Mass., 1968. In performing a particle-measuring using the above apparatus having the 40 micron openings and spacings (opening 5 was cylindrical), whole blood was diluted by adding 300 volume parts of isotonic NaCl-solution for 1 volume part blood. The electrolyte liquid was also isotonic NaCl-solution. The static liquid head difference between the chambers 4 and 6 was 0.39 atmospheres gage pressure, and between the chambers 6 and 8 the static liquid head difference was 0.01 atmospheres gage pressure. The electrodes 9, 10 and 11 were immersed in the electrolyte liquid within the chambers 4, 6 and 8 at any place. The potentials of electrodes 9, 10 and 11 were 30, 0 and 30 volts, respectively. For fixed adjustments of detector voltage, current and amplification, the pulses obtained at opening 5 (having a length of 20 microns) and opening 7 (having a length of 60 microns) for leucocytes, erythrocytes and agglomerated erythrocytes had characteristics as tabulated below:

|  | Leucocytes | | Erythro- | | Aggl. Erythr. | |
|---|---|---|---|---|---|---|
| Opening | 5 | 7 | 5 | 7 | 5 | 7 |
| Relative pulse heigth of mean cell volume | 1.0 | 1.0 | 0.4 | 0.5 | 0.8 | 1.0 |
| Duration [μs] at 50 % pulse heigth | 12 | 20 | 14 | 20 | 14 | 20 |

Under the same conditions, but with cylindrical openings 5 and 7 having the same length of 40 microns, a spacing of 40 microns between them and different diameters (opening 5 having a diameter of 40 microns and opening 7 having a diameter of 70 microns), the pulses obtained at openings 5 and 7 had characteristics as tabulated below:

|  | Leucocytes | | Erythrocytes | | Aggl. Erythr. | |
|---|---|---|---|---|---|---|
| Opening | 5 | 7 | 5 | 7 | 5 | 7 |
| Relative pulse heigth of mean cell volume | 1.0 | 1.0 | 0.42 | 0.5 | 0.85 | 1.0 |

One can see in the tables, that in both cases there are criterions enough to differentiate the pulses of the different cells. For discrimination of the pulse height and pulse length, one can use electronic equipment like it is described in the Proceedings Cambridge Phil. Soc. Vol. 46, Part 3, Page 508, like the Analog Comparator Type/uA 710 of Fairchild and for forming the ratio thereof, equipment is usable like dividers of Type D1 and D3 of Ancom of Cheltenham G.B. and of Type 4,452 of Teledyne Philbrick of Dedham, Mass. For distinguishing the pulse duration from reaching the pulse maximum till falling to a predetermined percentage of the maximum change on can use the well known zero-cross-over-method for sampling the pulse maximum. The voltage, corresponding to this pulse maximum, is divided by a simple potentiometer and fed to a well known comparator circuit. In this comparator circuit the divided voltage of the pulse maximum is compared with the pulse voltage and at the moment, when that voltage reaches the divided - that is the predetermined percentage -voltage, the comparator gives a pulse. The time duration from the pulse from the above mentioned zero-cross-over to the comparator pulse may be evaluated by any known electronic equipment, for instance by counters.

It will be understood that the above description of the present application is susceptible to various modifications, changes and adaptations, and the same are intended to be comprehended within the meaning and range of equivalents of the appended claims.

We claim:

1. An apparatus for counting and classifying particles suspended in a test liquid, comprising, in combination, means forming two measuring openings aligned, spaced from one another, and dimensioned differently, whereby a particle volume measurement may be obtained at one of the measuring openings and a particle cross section measurement may be obtained at the other of the measuring openings; tube means having an outlet section aligned with said measuring openings and situated spaced from a first of said measuring openings on the side of said first measuring opening opposite to the side facing the second of the measuring openings, for conducting test liquid toward said first measuring opening; the diameters of said measuring openings, the spacing between said two measuring openings, and the spacing between said first measuring opening and the outlet of said tube means being of the same order of magnitude; and vessel means surrounding said outlet section and said measuring openings for enabling said outlet section and said measuring openings to be immersed in an electrolyte.

2. An apparatus as claimed in claim 1, wherein the diameter of said second measuring opening is larger than the diameter of said first measuring opening.

3. An apparatus as claimed in claim 1, wherein said first measuring opening has a cylindrical shape, with a length of about 15 microns and a diameter of about 40 microns.

4. An apparatus as claimed in claim 1, wherein said first measuring opening has a conical shape, with a length of about 22 microns, an inlet diameter of about 50 microns, and an outlet diameter of about 43 microns.

5. An apparatus as claimed in claim 1, wherein at least the outlet section of said tube means, and the means forming the first measuring opening, include building blocks containing said outlet section and said first measuring opening, and a support element means for holding the outlet section spaced from the first measuring opening.

6. An apparatus as claimed in claim 5, further comprising means for exchangeably mounting said support element means relative to said vessel means.

7. An apparatus as claimed in claim 6, wherein said vessel means includes a dividing wall and said support element means forms a part of said dividing wall.

8. An apparatus as claimed in claim 5, wherein said support element means includes a tube and said building blocks are located in said tube.

9. An apparatus as claimed in claim 7, wherein said support element means includes a tube, said building blocks are located in said tube, and said tube is fitted into mating receiving areas in said dividing wall.

10. An apparatus as claimed in claim 8, said tube having hole means located for placing chamber area within said tube and between said building blocks in communication with the surrounding of the tube.

11. An apparatus as claimed in claim 1, wherein the outlet section of said tube means and the means forming said measuring openings include building blocks containing said outlet section, said first measuring opening, and said second measuring opening, and a support element means for holding the outlet section spaced from the first measuring opening and the first measuring opening spaced from the second measuring opening, and wherein said support element means includes a tube and said building blocks are located within said tube.

12. An apparatus as claimed in claim 11, said tube having hole means located for placing chamber area within said tube and between said building blocks in communication with the surrounding of the tube, with the hole means opening into the area between said outlet section and said first measuring opening being angularly offset with respect to the hole means opening into the area between said first measuring opening and said second measuring opening.

13. An apparatus as claimed in claim 10, said hole means having conical shapes.

14. An apparatus as claimed in claim 8, said tube containing a capillary tube means for conducting test liquid, said capillary tube means reaching to the side of said outlet opening opposite to that facing said first measuring opening.

15. An apparatus as claimed in claim 9, wherein the mating portions of said tube and dividing wall are conically shaped.

16. An apparatus as claimed in claim 8, wherein said tube is glass and the building blocks are drilled saphires glass-bonded to the inner surface of said tube.

17. In an apparatus for counting and classifying particles suspended in a test liquid, which apparatus operates according to the Coulter process and includes a first vessel containing electrolyte, a second vessel whose interior is in communication with the interior of the first vessel through a first small measuring opening through which electrolyte can flow from the first vessel into the second vessel, a device for feeding the test liquid to the measuring opening and whose outlet opening is located upstream coaxially and a small distance before the measuring opening such that electrolyte flowing into the measuring opening sucks test suspension out of the outlet opening and transports it into the center of the measuring opening, and electrodes placed at different electric potentials and arranged to reach down into the liquid in the vessels, with the electrodes being connected to an electrical circuit in which a current change is caused by the movement of a particle through the measuring opening, the amplitude of such current change being a measure of the size of the particle, the improvement comprising means presenting a second measuring opening arranged after the first measuring opening in the liquid stream, the opening diameters and/or the lengths of the two measuring openings being coordinated with one another such that one measuring opening allows essentially the volume and the other measuring opening essentially the cross section of the particles to be measured.

18. A method of using an apparatus for counting and classifying particles suspended in a test liquid and composed of two measuring openings which are aligned, spaced from one another, and dimensioned differently, whereby a particle volume measurement may be obtained at one of the measuring openings and a particle cross section measurement may be obtained at the other of the measuring openings; a tube having an outlet section aligned with the measuring openings and situated spaced from a first of the measuring openings on the side of the first measuring opening opposite to the side facing the second of the measuring openings, for conducting test liquid toward the first measuring opening; the diameters of the measuring openings, the spacing between the two measuring openings, and the spacing between the first measuring opening and the outlet of the tube being of the same order of magnitude; and a vessel surrounding the outlet section and the measuring openings for enabling the outlet section and the measuring openings to be immersed in an electrolyte; the method comprising placing a suspension of particles in said tube means, immersing said outlet section and said measuring openings in electrolyte, hydrodynamically sucking said suspension from the tube means and injecting it into the center of said first measuring opening including flowing entraining electrolyte into said first measuring opening toward said second measuring opening.

19. A method as claimed in claim 18, further comprising flowing the electrolyte and entrained suspension coming from said first measuring opening homogeneously from the first measuring opening into the second measuring opening.

20. A method as claimed in claim 18, further comprising matching the lengths of the particles and the length of said first measuring opening such that the length of the first measuring opening is shorter than the lengths of the particles.

21. A method as claimed in claim 18, further comprising flowing a greater amount of electrolyte through said second measuring opening than comes from said first measuring opening.

22. A method as claimed in claim 18, further comprising choosing said particles to include deformable particles and matching the dimensions of said measuring openings to the dimensions of the deformable particles such that the deformable particles are essentially deformed only in one of the measuring openings.

23. A method as claimed in claim 18, further comprising placing electrodes of different potential on either end of said other measuring opening for creating an electric field through said other measuring opening, and matching the lengths of the particles and the length of said other measuring opening such that the particle remains partially in a region of weakened field strength, when passing through the measuring opening.

24. A method as claimed in claim 18, further comprising focusing said suspension at said first measuring opening substantially in the absence of an electric field and measuring particle volume at said second measuring opening by sensing resistance changes in the resistance of said second measuring opening.

25. A method as claimed in claim 18, further comprising sensing the amplitudes of particle-caused changes in the electrical resistance of said other opening, for determining particle cross sections.

26. A method as claimed in claim 18, further comprising sensing the durations of particle-caused changes in the electrical resistance of said other opening, for determining particle cross sections.

27. A method as claimed in claim 18, further comprising sensing the amplitudes and the durations of particle-caused changes in the electrical resistance of said other opening, for determining particle cross sections.

28. A method as claimed in claim 27, further comprising forming the ratio of duration to amplitude, for determining particle cross sections.

29. A method as claimed in claim 18, further comprising sensing only changes in the electrical resistance of said other opening which exceed a predetermined amplitude, for determining particle cross sections.

30. A method as claimed in claim 18, further comprising sensing as the durations of particle-caused changes in the electrical resistance of said other opening those portions of changes lying above a predetermined amplitude level, for determining particle cross sections.

31. A method as claimed in claim 18, further comprising sensing as the durations of particle-caused changes in the electrical resistance of said other opening those portions of changes lying between the reaching of the maximum change and the fall to a predetermined percentage of the maximum change, for determining particle cross sections.

* * * * *